Figure 1:
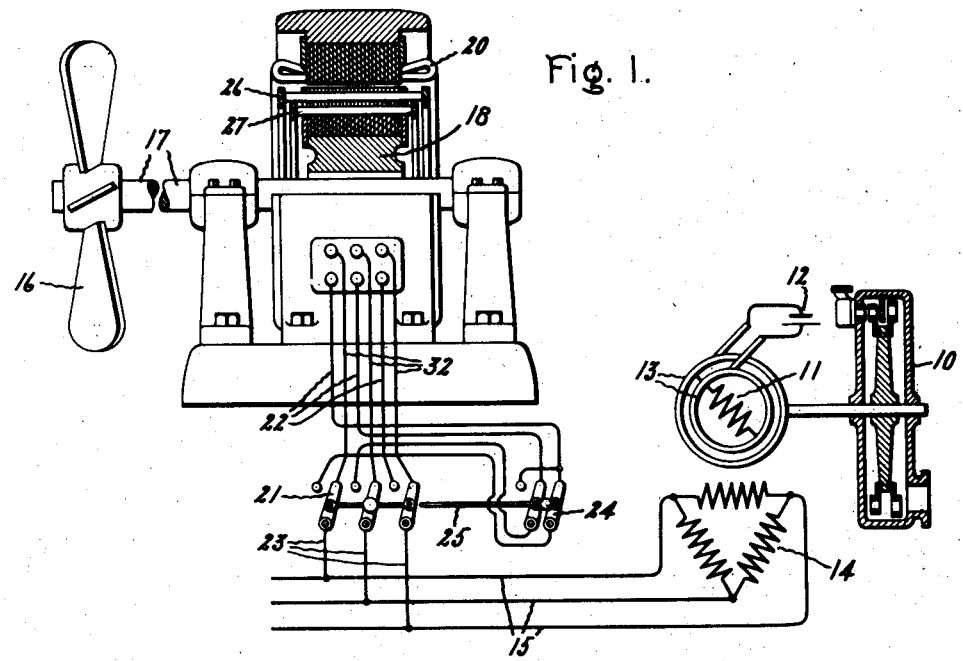

W. L. R. EMMET.
ELECTRIC SHIP PROPULSION.
APPLICATION FILED MAR. 23, 1916.

1,313,078.

Patented Aug. 12, 1919.
2 SHEETS—SHEET 1.

Inventor:
William L. R. Emmet,
by Albert G. Davis
His Attorney.

W. L. R. EMMET.
ELECTRIC SHIP PROPULSION.
APPLICATION FILED MAR. 23, 1916.

1,313,078.

Patented Aug. 12, 1919.
2 SHEETS—SHEET 2.

Inventor:
William L. R. Emmet,
by Albert G. Davis
His Attorney.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

ELECTRIC SHIP PROPULSION.

1,313,078.   Specification of Letters Patent.   Patented Aug. 12, 1919.

Application filed March 23, 1916. Serial No. 86,109.

*To all whom it may concern:*

Be it known that I, WILLIAM L. R. EMMET, a citizen of the United States, residing at Schenectady, county of Schenectady, State of New York, have invented certain new and useful Improvements in Electric Ship Propulsion, of which the following is a specification.

My invention relates to ship propulsion, and in particular to the propulsion of ships by electric motors. The object of the invention is to improve the propulsion of ships by electric motors.

The most severe duty which the propelling apparatus of a ship is called upon to perform is the reversal or even the stopping of the ship after full speed ahead. Where the ship's propellers are driven by electric motors, the direction of the ship's movement is reversed by reversing the direction of rotation of the propeller-driving motors. In order to reverse the ship's propellers, the motors must be able to overcome the turning force which is imparted to the propellers by the forward movement of the ship. A very large initial or starting torque of the propeller-driving motors is required for this purpose, and to this end I have heretofore proposed particular electrical connections of the motors especially designed to produce motor characteristics required for reversing the ship. In these prior systems, the electrical connections for adapting the motor or motors for the requirements of reversal are effected by one switch and the actual reversal of the direction of rotation of the motor or motors is effected by a second independent switch. I have now discovered that it is particularly desirable to insure the making of the particular electrical connections designed for reversal when the reversing switch of the propeller-driving motor or motors is operated, as otherwise the operator of the propelling apparatus might throw the reversing switch without having first made the appropriate motor connections for reversal. In the case of an emergency reversal this might prove disastrous, since the electrical connections of the motor or motors which existed when the reversing switch was thrown might not, and probably would not, be such as to produce sufficient motor torque to immediately reverse the propellers. The aim of my present invention, is, therefore, to provide means actuated by the movement of the reversing switch for effecting the special electrical connections of the motor or motors particularly provided for reversing conditions.

Figure 2:
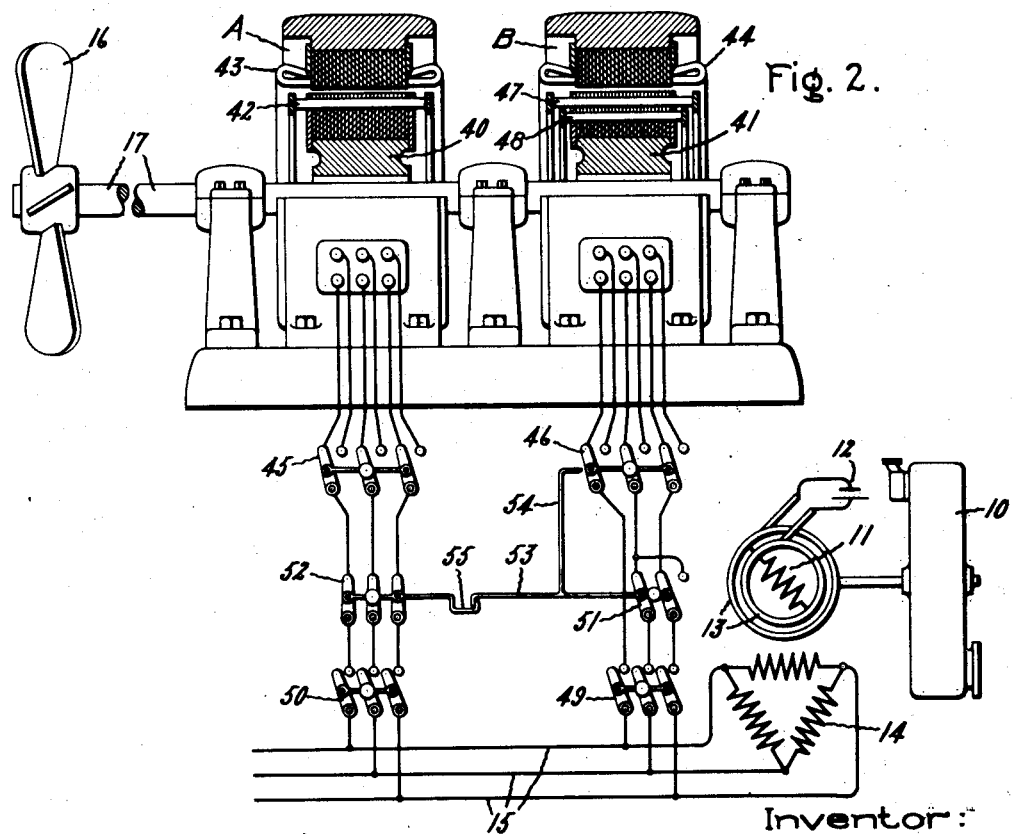
Figure 3:
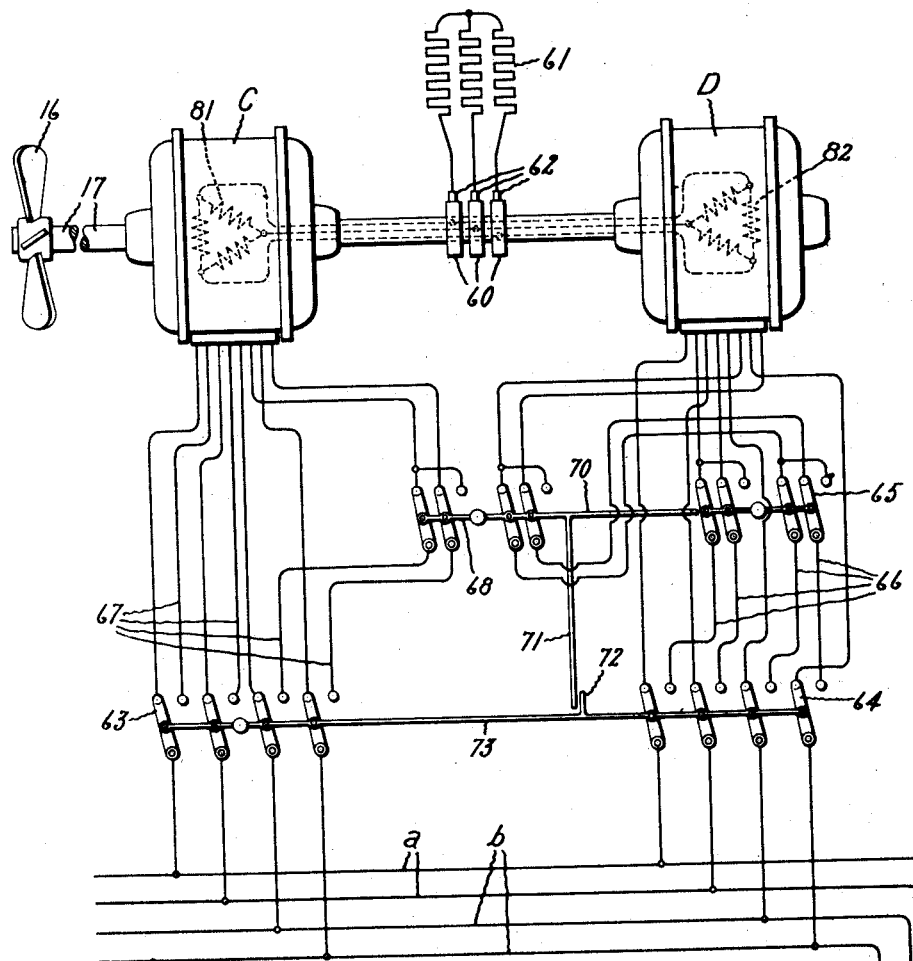
Figure 4:
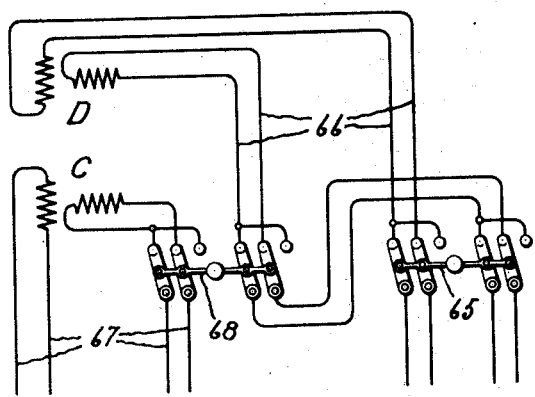
Figure 4:
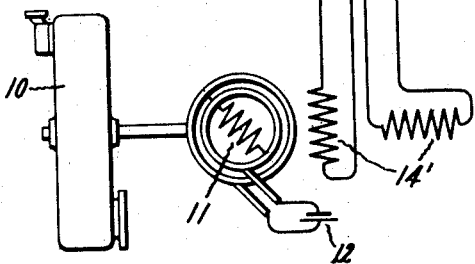

The novel features which I believe to be patentably characteristic of my invention are definitely pointed out in the claims appended hereto the principle of the invention and its application to electric systems of ship propulsion in which it is adapted to be employed will be better understood from the following description taken in conjunction with the accompanying drawings, in which:

Figures 1, 2, and 3 diagrammatically illustrate three embodiments of my invention, in which different electrical connections of the propeller-driving motors are provided for the purpose of producing the required motor characteristics for reversing the ship; and Fig. 4 is an explanatory diagram of certain of the electrical connections of the primary windings of the propeller-driving motors of Fig. 3.

In my copending application for Letters Patent of the United States, Ser. No. 38,807, filed July 8, 1915, patented Jan. 14, 1919, No. 1,290,945, I have described the characteristics required for the reversal of a ship, and the difficulties encountered in satisfactorily meeting such requirements. In that application I have disclosed the method of increasing the number of primary magnetic poles of a propeller-driving induction motor for obtaining an increased motor torque for reversing or stopping the ship after full speed ahead. I have further explained in that application that in addition to pole-changing I deem it generally advisable to provide means for accentuating the reversing torque, as, for example, by increasing the secondary resistance losses of the motor for the reversing polar arrangement, or by increasing in any suitable way the secondary losses at relatively large slips of the motor. In Fig. 1 of the accompanying drawings, I have illustrated my present invention embodied in a propelling apparatus of the type described in the above-mentioned application.

Referring to Fig. 1 of the drawings, there is diagrammatically represented an elastic fluid turbine 10 mechanically coupled to a polyphase alternator. I have shown, for the purpose of illustration, an alternator of the revolving field type having an exciting winding 11 supplied with direct current from any suitable source 12 by means of slip rings 13 and coöperating brushes. The alternator has a polyphase stator winding 14 connected to bus bars 15, or the like. A propeller 16 is mounted on the same shaft 17 as the rotor 18 of an induction motor. In the drawings I have illustrated the secondary winding of the motor as carried by the rotor member, and the primary winding as mounted in the stator member, but it will, of course, be understood that the primary winding may be carried by the rotor member, in which case the secondary winding will be incorporated in the stator member.

The primary winding 20 of the motor is adapted to be arranged for a plurality of different pole numbers. To this end, any of the well known means for producing primary magnetic poles of different pole numbers may be employed, and since there are numerous arrangements for accomplishing this result, I do not deem it necessary to explain in detail any specific means, but by way of example I will mention a patent to Ernst F. W. Alexanderson, No. 841,609, dated January 15, 1907, as illustrating one way in which the primary winding 20 may be arranged to produce primary magnetic poles of different pole numbers. For the purpose of explaining my invention, I have illustrated a pole-changing switch 21 connected to the primary winding 20 by six leads 22 and 32 and to the bus bars 15 by three leads 23. This diagrammatic representation of a primary winding adapted for pole-changing will be well understood by those skilled in the art. When the pole-changing switch 21 occupies the position shown in Fig. 1, the leads 32 are connected to the bus bars 15, and the primary winding of the motor is arranged to produce the lower pole number, that is, the high-speed pole number. On the other hand, when the switch 21 is thrown to its left-hand position, as viewed in Fig. 1, the leads 22 are connected to the bus bars 15, and the primary winding of the motor is arranged for its high pole number, which is the pole number particularly adapted for reversal as explained in my aforementioned application.

A hand-operated reversing switch 24 is associated with the leads 22, and is thus adapted to reverse the phase rotation for only the high pole number of the primary winding. In accordance with my present invention, the pole-changing switch 21 and the reversing switch 24 are interlocked in such a way that the pole-changing switch 21 may be freely thrown into either of its positions when the reversing-switch is in its normal position, but so that the pole-changing switch 21 is thrown to produce the reversing polar arrangement of the primary winding when the reversing switch 24 is moved to its reversing position. In order to explain the principle of my invention, I have illustrated in Fig. 1 of the drawings a very simple interlocking means between the switches 21 and 24, and it will, of course, be understood that this simple interlocking means is merely shown for the purpose of explanation. The switch 24 is provided with an arm 25 which does not interfere with the movement of the pole-changing switch 21 when the reversing switch 24 occupies its normal "ahead" position. When the reversing switch 24 is thrown to its reversing or "astern" position, the pole-changing switch 21 will be moved by the arm 25 to connect the primary winding of the motor for its higher pole number. Of course, if the pole-changing switch has already been thrown so as to produce the reversing pole number of the primary winding, the arm 25 will merely move into contact with the switch 21 and will prevent the movement of the pole-changing switch while the reversing switch occupies its reversing position. It will thus be observed that the interlocking means between the pole-changing switch and the reversing switch insures the making of the particular electrical connections designed to produce the required motor characteristics for reversal and prevents any change in these particular motor connections, while the reversing switch is in its reversing position.

For the purpose of accentuating the motor torque during the period of reversal, I have illustrated in Fig. 1 a double squirrel-cage winding carried by the secondary member 18 of the motor. This double squirrel-cage winding comprises a squirrel-cage winding 26 of relatively high ohmic resistance and a squirrel-cage winding 27 of relatively low ohmic resistance. The conductor bars of the low resistance winding 27 are positioned in slots well beneath the surface of the magnetic core of the rotor and beneath the conductor bars of the high resistance winding 26. The operating characteristics and peculiar advantages of this type of secondary winding in a propeller-driving induction motor are fully described in my aforementioned application and in an aplication for Letters Patent of the United States filed on behalf of Ernst F. W. Alexanderson, Ser. No. 763,696, filed April 26, 1913, patented Feb. 6, 1917, No. 1,215,094.

In Fig. 2 of the accompanying drawings, I have illustrated my present invention embodied in an electric propelling apparatus of the type disclosed in my copending application Ser. No. 38,808, filed July 8, 1915, patented Jan. 14, 1919, No. 1,290,946. In this apparatus, two motors A and B have their rotors 40 and 41, respectively, mounted on the propeller shaft 17. The motor A has a short-circuited secondary winding 42 of low resistance, such as a low resistance squirrel-cage winding. The primary windings 43 and 44 of the motors A and B are each adapted to be arranged for a plurality of different pole numbers, just as explained in connection with the primary winding 20 of the motor of Fig. 1. The motor A is thus represented as provided with a pole-changing switch 45, and the motor B with a pole-changing switch 46. The secondary member 41 of the motor B is provided with a double squirrel-cage winding comprising a high resistance squirrel-cage winding 47 and a low resistance squirrel-cage winding 48, just as explained in connection with the motor of Fig. 1. As explained in my application Ser. No. 38,808, the primary windings 21 and 22 are arranged for their high speed pole numbers, and both motors are connected to the bus bars 15 for running the ship at full speed ahead, and for normal cruising at lower speeds motor B is disconnected from the bus bars 15 by means of the switch 49, and the primary winding 43 of motor A is arranged for its low speed pole number, while for reversing the motor A is disconnected from the bus bars 15 by means of a switch 50, and the motor B is used alone with its primary winding 44 arranged for its low speed pole number. The motor B is, accordingly, provided with a hand-operated reversing switch 51. In accordance with my present invention, the reversing switch 51 is interlocked with the pole-changing switch 46 of the motor B and with an auxiliary disconnecting switch 52 of the motor A, so that the movement of the reversing switch to its reversing position opens the disconnecting switch 52, thereby disconnecting the motor A from the bus bars 15, and simultaneously moves the pole-changing switch 46 to connect the primary winding 44 of the motor B for its low speed or reversing pole number. The reversing switch 51 is interlocked with the disconnecting switch 52 through a horizontal bar 53 having a lost motion connecting means 55 so that when the switch 51 is in its normal position the switch 52 can be freely operated, whereas when the switch 51 is thrown to its reversing position, the disconnecting switch 52 is moved to its open circuit position, if not already in that position, and is maintained thus while the switch 51 is in its reversing position. A vertical arm 54 is secured to the arm 53 and operates to move the pole-changing switch 46 to its right-hand or low speed position when the reversing switch is thrown to its reversing position. When the reversing switch 51 is in its normal position, the arm 54 does not interfere with the movement of the pole-changing switch 46. The interlocking means between the three switches 51, 52, and 46 thus insures the proper motor connections for reversal and prevents any change in these motor connections while the reversing switch 51 occupies its reversing position. The remaining elements of the apparatus diagrammatically illustrated in Fig. 2 will be understood from the description of corresponding elements in the apparatus of Fig. 1.

In Fig. 3 of the drawings I have illustrated an elastic fluid turbine 10 direct-coupled to an alternating current generator of the revolving field type. This generator differs from those illustrated in the preceding figures only in the fact that the armature winding 14' is a quarter phase winding instead of a three phase winding. The armature winding 14' is connected to quarter phase bus bars $a$ and $b$, corresponding to the two phases of the generator. Two similar induction motors C and D have their rotors direct-connected to the propeller shaft 17. The stator windings of the motors C and D are wound for the same numbers of poles and are so connected that corresponding poles have relatively the same angular positions in space. The rotors of the two motors C and D are provided with phase wound secondary windings 81 and 82, respectively, which are so connected that the corresponding poles have the same angular positions in space. The secondary windings of both motors are connected to a single set of slip rings 60. An external resistance 61 is permanently connected to the slip rings 60 by means of brushes 62. The secondary windings of the motors C and D are three phase windings, as diagrammatically represented in Fig. 3, and, accordingly, only three slip rings 60 are needed. The stator windings of the motors C and D are each quarter phase windings designed for pole-changing, and the two motors are, therefore, provided with pole-changing switches 63 and 64, respectively. A switch 65 is provided for displacing the poles of the motor D 180 electrical degrees from the poles of the motor C. The pole-displacing switch 65 is included in leads 66, which when connected to the bus bars $a$ and $b$ through the pole-changing switch 64 establish the low speed pole number of the motor D. The pole-changing switch 63 when connected to leads 67 establishes the corresponding low speed pole number of the motor C. A reversing switch 68 is included in the leads 66 and 67, and operates to reverse the direction of rotation of both motors C and D. The electrical connections between the primary windings of the motors C and D and the switches 65 and 68 will be clearly understood by reference to Fig. 4. This specific arrangement of parts, shown in Figs. 3 and 4 which coöperate to necessitate the proper motor connections when the reversing switch is thrown, while particularly advantageous for two motors connected so that their secondary windings may be locally short circuited is not claimed specifically in this application but is claimed in my copending application Serial No. 86,110 filed March 23, 1916.

The operation of the apparatus of Fig. 3 is as follows: When the pole-changing switches 63 and 64 occupy the positions represented in the drawings, the primary windings of the motors C and D are arranged for their high speed pole numbers, and since the poles of both primary and secondary windings have the same angular positions in space, the electromotive forces in the two secondary windings will act in conjunction, and, accordingly, the two secondary windings will be in effect series-connected and of relatively low resistance. This condition corresponds to the full speed operation of the ship. A cruising speed can be obtained by throwing both pole-changing switches 63 and 64 to their right-hand positions, as viewed in Fig. 3, which establishes the low speed polar arrangements of the primary windings of the two propeller-driving motors. If the pole-displacing switch 65 is moved to its right-hand position, Fig. 3, when the pole-changing switches 63 and 64 occupy their right-hand positions, the primary magnetic poles of the motor D become relatively displaced 180 electrical degrees from the primary magnetic poles of the motor C, and, accordingly, corresponding sections of the two secondary windings of these motors are no longer electrically connected in series, but are connected in parallel, wherefore the secondary circuit of each motor must be completed through the external resistance 61. Under this condition, the secondary circuits of the motors C and D have relatively high resistance, and the motors, accordingly, have relatively high starting torques.

The reversing switch 68 operates to reverse one phase of the primary winding of each of the motors C and D. In accordance with my present invention, the reversing switch 68 is interlocked with the pole-displacing switch 65 and the pole-changing switches 63 and 64. As diagrammatically illustrated in Fig. 3, the interlocking means between these four switches comprises a horizontal bar 70 which moves the pole-displacing switch 65 into its right-hand position when the reversing switch is moved to its reversing position. A depending arm 71 is secured to the arm 70 and engages a lug 72 on an arm 73 rigidly connecting the switches 63 and 64, whereby the switches 63 and 64 are moved to their respective low speed positions, if not already in such positions, when the reversing switch is operated to reverse the motors C and D. When the reversing switch 68 is in its normal or left-hand position, as viewed in Fig. 3, the pole-changing switches 63 and 64 can be freely moved. Similarly, the pole-displacing switch 65 can be freely moved when the reversing switch 68 occupies its normal position. The pole-displacing switch 65 is associated only with the low speed polar arrangement of the motor D, since efficiency is the main prerequisite with the high speed polar arrangement, and since in general practice it will only be desirable to include the external resistance 61 in the secondary circuits of the propeller-driving motors for the low speed polar arrangement. Movement of the pole-displacing switch 65 to its right-hand position thus inserts the external resistance 61 in the secondary circuits of the motors C and D, thereby providing the high starting torque which is necessary for reversing or stopping after full speed ahead. The particular electrical connections designed to produce the required motor characteristics for reversing the ship are thus effected in the apparatus of Fig. 3 by moving the pole-changing switches 63 and 64 to their low speed positions and simultaneously moving the pole-displacing switch 65 to displace the primary magnetic poles of the motor D 180 electrical degrees from the corresponding poles of the motor C. These switches are, in accordance with my present invention, so interlocked with the hand-operated reversing switch 68 that the making of these particular motor connections for reversing are insured, and further so that the electrical connections of the motors cannot be altered while the reversing switch is in its reversing position.

The interlocking means between the reversing switch and the switch or switches for making the desired motor connections for reversal are in practice of suitable design and character to meet the mechanical and electrical requirements of the equipment in hand. It will, of course, be understood that the interlocking means has been illustrated in the accompanying drawings in an elementary manner merely for the purpose of explaining the principle of my invention in a simple way. Those skilled in the art will readily understand that in carrying the invention out in practice, oil switches and any mechanical, magnetic or other type of interlocking means may be employed.

I have herein shown and particularly described certain embodiments of my invention for the purpose of explaining its principle and illustrating its applications, but numerous modifications of such embodiments and other applications will present themselves to those skilled in the art. I, accordingly, wish to cover by the following claims all modifications within the spirit of the invention.

What I claim as new, and desire to secure by Letters Patent of the United States, is:—

1. An electric system of ship propulsion comprising in combination a propeller, an alternating current induction motor operatively arranged for driving said propeller, said induction motor having means for producing primary magnetic fields of two different pole numbers one of which is especially adapted for reversing conditions, means for reversing the direction of rotation of said induction motor to drive said propeller in a backward direction, and means coöperating with said reversing means for necessitating the arrangement of said motor to produce said number of primary magnetic poles particularly adapted for reversing only when said reversing means is actuated to drive the propeller in a backward direction.

2. An electric system of ship propulsion comprising in combination a propeller, an alternating current induction motor operatively arranged for driving said propeller, said induction motor having means for producing primary magnetic fields of two different pole numbers, means associated with said induction motor for altering the connections thereof so as to develop an increased torque sufficient for reversing operations, means for reversing the direction of rotation of said induction motor to drive said propeller in a backward direction, and means coöperating with said reversing means for necessitating the connection of said induction motor to develop said increased torque whenever said reversing means is actuated to drive the propeller in a backward direction.

3. An electric system of ship propulsion comprising in combination a propeller, an alternating current induction motor operatively arranged for driving said propeller, said induction motor being equipped with means for producing primary magnetic fields of different pole numbers, one of said pole numbers being particularly adapted to give the motor sufficient torque for reversing operations, means for reversing the direction of rotation of said motor to drive said propeller in a backward direction, and means coöperating with said reversing means for necessitating the arrangement of said motor to produce that primary magnetic field of the pole number particularly adapted for reversing operation only when the reversing means is actuated to drive the propeller in a backward direction.

4. An electric system of ship propulsion comprising in combination a propeller, an alternating current induction motor means operatively arranged for driving said propeller, means whereby said induction motor means can be arranged to produce primary magnetic poles of different pole numbers, one of said pole numbers being particularly adapted for reversing operations, means associated with said induction motor means for enabling said motor means to develop an increased torque sufficient for reversing operations, means for reversing the direction of rotation of said induction motor means to drive said propeller in a backward direction, and means coöperating with said reversing means for necessitating the arrangement of said motor means to produce said number of primary magnetic poles and said increased torque particularly adapted for reversing operation whenever the reversing means is actuated to drive the propeller in a backward direction.

In witness whereof, I have hereunto set my hand this 22nd day of March, 1916.

WILLIAM L. R. EMMET.